(12) United States Patent
Olano (10) Patent No.: US 6,657,624 B2
(45) Date of Patent: Dec. 2, 2003

(54) SYSTEM, METHOD, AND COMPUTER PROGRAM PRODUCT FOR REAL-TIME SHADING OF COMPUTER GENERATED IMAGES

(75) Inventor: Thomas M. Olano, San Francisco, CA (US)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 10/024,330

(22) Filed: Dec. 21, 2001

(65) Prior Publication Data

US 2003/0117391 A1 Jun. 26, 2003

(51) Int. Cl.[7] .............................................. G06T 15/00
(52) U.S. Cl. .................................................... 345/426
(58) Field of Search ................................ 345/419, 420, 345/426, 619, 620, 625, 628

(56) References Cited

U.S. PATENT DOCUMENTS

| | | | | |
|---|---|---|---|---|
| 5,920,860 A | * | 7/1999 | Maheshwari et al. | 707/5 |
| 5,963,209 A | * | 10/1999 | Hoppe | 345/419 |
| 5,966,133 A | * | 10/1999 | Hoppe | 345/420 |
| 6,046,744 A | * | 4/2000 | Hoppe | 345/419 |

OTHER PUBLICATIONS

Lindholm, E., "Chapter 7, Vertex Programs and Texture Shaders," *SIGGRAPH 2001 Course 24 Notes—Real Time Shading*, pp. 7–1 through 7–43 (Aug. 2001) (Distributed at SIGGRAPH 2001, Aug. 12–17, 2001).

Mark, W., "Chapter 8—Stanford Real–Time Programmable Shading System, Part 1—Stanford Real–Time Programmable Shading System," *SIGGRAPH 2001 Course 24 Notes—Real Time Shading*, pp. 8–1 through 8–7 (Aug. 2001) (Distributed at SIGGRAPH 2001, Aug. 12–17, 2001).

Mark, W., "Chapter 2—Stanford Real–Time Programmable Shading System, Part 8—Shading System Immediate–Mode API v2.1," *SIGGRAPH 2001 Course 24 Notes—Real Time Shading*, pp. 8–8 through 8–15 (Aug. 2001) (Distributed at SIGGRAPH 2001, Aug. 12–17, 2001).

Heidrich, W., "Chapter 5, Real–time Shading: Hardware Shading Effects," *SIGGRAPH 2001 Course 24 Notes—Real Time Shading*, pp. 5–1 through 5–14 (Aug. 2001) (Distributed at SIGGRAPH 2001, Aug. 12–17, 2001).

Peercy et al., "Chapter 6—Shading Through Multi–Pass Rendering, Part 1—Interactive Multi–Pass Programmable Shading," *SIGGRAPH 2001 Course 24 Notes—Real Time Shading*, pp. 6–1 through 6–8 (Aug. 2001) (Distributed at SIGGRAPH 2001, Aug. 12–17, 2001).

(List continued on next page.)

*Primary Examiner*—Phu K. Nguyen
(74) *Attorney, Agent, or Firm*—Sterne, Kessler, Goldstein & Fox PLLC (57) ABSTRACT

A level of detail shading function is produced and stored in a computer readable memory. The level of detail shading function is produced by receiving a shading function, identifying in the shading function at least one candidate block of code for simplification, and generating, for each candidate block of code, at least one simplified block of code that can be substituted for the candidate block of code during image rendering. Candidate blocks of code and simplified blocks of code according to the invention are associated with at least one input parameter and assembled to form the level of detail shading function. During the rendering of an object, input parameters are provided to the level of detail shading function. These input parameters are associated with one or more blocks of code in the level of detail shading function. The input parameters specify how the object is to be shaded using the level of detail shading function.

38 Claims, 9 Drawing Sheets

OTHER PUBLICATIONS

Olano, M., "Chapter 6—Shading Through Multi–Pass Rendering, Part 2—Interactive Shading Language (ISL) Language Description," in OpenGL Shader 2.2 distribution, *SIGGRAPH 2001 Course 24 Notes—Real Time Shading*, pp. 6–9 through 6–29 (Aug. 2001) (Distributed at SIGGRAPH 2001, Aug. 12–17, 2001).

Olano, M., "Chapter 3—PixelFlow Shading, Part 2—PixelFlow Shading Language," *SIGGRAPH 2001 Course 24 Notes—Real Time Shading*, pp. 3–41 through 3–46 (Aug. 2001) (Distributed at SIGGRAPH 2001, Aug. 12–17, 2001).

Olano, M., "Chapter 3—PixelFlow Shading, Part 3—Implementing PixelFlow Shading," *SIGGRAPH 2001 Course 24 Notes—Real Time Shading*, pp. 3–47 through 3–52 (Aug. 2001) (Distributed at SIGGRAPH 2001, Aug. 12–17, 2001).

Heidrich, W., "Chapter 4, Real–time Shading: Sampling Procedural Shaders," *SIGGRAPH 2001 Course 24 Notes—Real Time Shading*, pp. 4–1 through 4–8 (Aug. 2001) (Distributed at SIGGRAPH 2001, Aug. 12–17, 2001).

Olano, M., "Chapter 1, Introduction,"*SIGGRAPH 2001 Course 24 Notes—Real Time Shading*, pp. 1–1 through 1–4 (Aug. 2001) (Distributed at SIGGRAPH 2001, Aug. 12–17, 2001).

Perlin, K., "Chapter 2, In the Beginning: The Pixel Stream Editor," *SIGGRAPH 2001 Course 24 Notes—Real Time Shading*, pp. 2–1 through 2–10 (Aug. 2001) (Distributed at SIGGRAPH 2001, Aug. 12–17, 2001).

Leech, J., "Chapter 3—PixelFlow Shading, Part 1—OpenGL Extensions and Restrictions for PixelFlow," *SIGGRAPH 2001 Course 24 Notes—Real Time Shading*, pp. 3–1 through 3–40 (Aug. 2001) (Distributed at SIGGRAPH 2001, Aug. 12–17, 2001).

"Bibliography, a Collection of Useful References," *SIGGRAPH 2001 Course 24 Notes—Real Time Shading*, pp. 15–1 through 15–7 (Aug. 2001) (Distributed at SIGGRAPH 2001, Aug. 12–17, 2001).

Guenter, B. et al., "Specializing Shaders," *SIGGRAPH 95 Conference Proceedings—Computer Graphics*, ACM Press, Aug. 6–11, 1995, pp. 343–350.

Luebke, David P., "A Developer's Survey of Polygonal Simplification Algorithms," Tutorial, Department of Computer Science, Univeristy of Virginia,, Jan. 18, 1999.

McCool, M., "Chapter 12, SMASH: A Next–Generation API for Programmable Graphics Accelerators," *SIGGRAPH 2001 Course 24 Notes—Real Time Shading*, pp. 12–1 through 12–31 (Aug. 2001) (Distributed at SIGGRAPH 2001, Aug. 12–17, 2001).

Hart et al., "Chapter 13, ATI Shading Extensions, Hardware Shading with EXT_vertex_shader and ATI_fragment_shader," *SIGGRAPH 2001 Course 24 Notes—Real Time Shading*, pp. 13–1 through 13–14 (Aug. 2001) (Distributed at SIGGRAPH 2001, Aug. 12–17, 2001).

Hart et al., "Chapter 14, Analysis of Shsding Pipelines, A Framework for Analyzing Real–Time Advanced Shading Techniques," *SIGGRAPH 2001 Course 24 Notes—Real Time Shading*, pp. 14–1 through 14–10 (Aug. 2001) (Distributed at SIGGRAPH 2001, Aug. 12–17, 2001).

Carr et al., "Chapter 10—Procedural Solid Texturing, Part 2—Real–Time Procedural Solid Texturing," *SIGGRAPH 2001 Course 24 Notes—Real Time Shading*, pp. 10–11 through 10–18 (Aug. 2001) (Distributed at SIGGRAPH 2001, Aug. 12–17, 2001).

Hart, J., "Chapter 10—Procedural Solid Texturing, Part 3—Perlin Noise Pixel Shaders," *SIGGRAPH 2001 Course 24 Notes—Real Time Shading*, pp. 10–19 through 10–26 (Aug. 2001). (Distributed at SIGGRAPH 2001, Aug. 12–17, 2001).

Olano, M., "Chapter 11, Multi–Pass RenderMan," *SIGGRAPH 2001 Course 24 Notes—Real Time Shading*, pp. 11–1 through 11–8 (Aug. 2001) (Distributed at SIGGRAPH 2001, Aug. 12–17, 2001).

Proudfoot, K., "Chapter 8—Stanford Real–Time Programmable Shading System, Part 3—Stanford Real–Time Shading Language," *SIGGRAPH 2001 Course 24 Notes—Real Time Shading*, pp. 8–16 through 8–37 (Aug. 2001) (Distributed at SIGGRAPH 2001, Aug. 12–17, 2001).

Perlin, K., "Chapter 9, Noise Hardware," *SIGGRAPH 2001 Course 24 Notes—Real Time Shading*, pp. 9–1 through 9–24 (Aug. 2001) (Distributed at SIGGRAPH 2001, Aug. 12–17, 2001).

Hart et al., "Chapter 10—Procedural Solid Texturing, Part 1—Antialiased Parameterized Solid Texturing Simplified for Consumer–Level Hardware Implementation," *SIGGRAPH 2001 Course 24 Notes—Real Time Shading*, pp. 10–1 through 10–10 (Aug. 2001) (Distributed at SIGGRAPH 2001, Aug. 12–17, 2001).

* cited by examiner

METHOD FOR REAL-TIME SHADING OF A COMPUTER GENERATED IMAGE

↓

STORE AT LEAST ONE SHADING PROCEDURE IN A MEMORY, THE AT LEAST ONE SHADING PROCEDURE HAVING BEEN PRODUCED BY: — 802

(1) RECEIVING A SHADING FUNCTION,
(2) IDENTIFYING IN THE SHADING FUNCTION AT LEAST ONE CANDIDATE BLOCK OF CODE FOR SIMPLIFICATION,
(3) GENERATING, FOR EACH CANDIDATE BLOCK OF CODE IDENTIFIED IN STEP (2), AT LEAST ONE SIMPLIFIED BLOCK OF CODE THAT CAN BE SUBSTITUTED FOR THE CANDIDATE BLOCK OF CODE DURING IMAGE RENDERING,
(4) ASSOCIATING EACH CANDIDATE BLOCK OF CODE IDENTIFIED IN STEP (2) AND EACH SIMPLIFIED BLOCK OF CODE GENERATED IN STEP (3) WITH AT LEAST ONE INPUT PARAMETER, AND
(5) ASSEMBLING EACH CANDIDATE BLOCK OF CODE IDENTIFIED IN STEP (2) AND EACH SIMPLIFIED BLOCK OF CODE GENERATED IN STEP (3) INTO A LEVEL OF DETAIL SHADING FUNCTION

↓

SPECIFY THE STATE OF THE AT LEAST ONE INPUT PARAMETER — 804

↓

RENDER AN OBJECT IN REAL-TIME USING AT LEAST ONE BLOCK OF CODE SELECTED FROM THE AT LEAST ONE SHADING PROCEDURE BASED ON THE STATE OF THE AT LEAST ONE INPUT PARAMETER — 806

SYSTEM, METHOD, AND COMPUTER PROGRAM PRODUCT FOR REAL-TIME SHADING OF COMPUTER GENERATED IMAGES

FIELD OF THE INVENTION

The invention relates to computer graphics. More particularly, it relates to rendering a computer image.

BACKGROUND OF THE INVENTION

Computer graphics systems are used to render all kinds of objects for display. In general, it is important that objects rendered for display appear as realistic to a viewer as possible. This is particularly the case, for example, in computer graphics imagery (CGI) for use in motion pictures and animation. As would be known to a person skilled in the relevant art, realistic scenes are typically rendered using complex, programable shading.

Complex shading involves the use of a special programming language known in the relevant art as a shading language. A shading language is used to specify the appearance and surface characteristics of objects in an image or a scene. See Pat Hanrahan and Jim Lawson, "A language for Shading and Lighting Calculations," in *Computer Graphics* (*SIGGRAPH '90 Proceedings*) Vol. 24, pp. 289–94, which is herein incorporated by reference in its entirety, for a description of a shading language. A typical shading language can simulate a wide variety of appearances including, for example, wood, metal, plastic, fabric, glass, hair, skin, et cetera. A shading language can also be used to describe the emission characteristics of light sources in a scene, the color and reflective properties of each object in a scene, and the transmittance properties of atmospheric media. In many CGI applications, the appearance and surface characteristics of every object in a scene are described using a shading language. As would be known to a person skilled in the relevant art, programmable shading plays an important role in the creation of special effects for movies and television. Programmable shading also plays an important role in other applications as well, for example, in engineering and scientific applications for visualization of data.

A typical software application program accesses shading language procedures through a programmable interface extension of a graphics application programming interface (graphics API). As would be known to a person skilled in the relevant art, a shading language is basically a library of procedures, known in the relevant art as shaders, that can be called during the rendering of an image. A shading language procedure can have very general programming constructs such as loops, conditional statements, and functions. In some examples, shading language source files (i.e., procedures) are compiled to produce object files. When a scene description using a shading language is being rendered, an object file corresponding to a shader must be retrieved from a library and loaded into the memory of the computer graphics system being used to render the scene. The object file must then be executed by the graphics system's general purpose processor in order to produce the desired effects in the rendered scene.

In many applications, it is important that the computer graphics system used to render objects for display operate at an interactive rate. The known methods used to implement complex shading language procedures place a significant burden on the graphics hardware and driver software of computer graphics systems. For example, graphics hardware is generally designed to support a parametric appearance model. Phong lighting is evaluated per vertex with one or more texture maps applied after Gouraud interpolation of the lighting results. Therefore, known complex shading language procedures are typically translated into a general purpose programming language and compiled to run on a general purpose processor. Because general purpose processors are not designed to process millions of pixels each second, as are special purpose graphics processors and graphics hardware, the known methods used to implement complex shading language procedures cannot be implemented at an interactive rate on most, if not all, available computer graphic systems.

Simple shading capabilities are supported, for example, by the NVIDIA GEFORCE3 and ATI RADEON 8500 graphics systems. These shading capabilities are generally in the form of straight-line sections of assembly code, which do not support branching or looping. These graphic systems do not support complex shading.

What is needed are new techniques for implementing shading procedures at an interactive rate in computer graphics systems.

BRIEF SUMMARY OF THE INVENTION

The present invention provides a system, method, and computer program product for real-time shading of computer generated images. A level of detail shading function is produced and stored in a computer readable memory. During the rendering of an object, input parameters are provided to the level of detail shading function. These input parameters are associated with one or more blocks of code in the level of detail shading function. The input parameters specify how an object is to be shaded using the level of detail shading function.

In an embodiment of the invention, a level of detail shading function is produced using computer program logic that controls the operation of a processor. The computer program logic is implemented using a computer or host system having at least one processor. Under the control of the computer program logic, the host system receives a shading function. The received shading function includes computer code. The shading function can be received, for example, by reading the shading function from a computer readable medium or a memory.

Under the control of the computer program logic, the host system analyzes the code of the shading function to identify at least one candidate block of code in the shading function that can be simplified. After the candidate block of code is identified, simplified blocks of code are generated that can be used in lieu of the candidate block of code during the rendering of an object. Candidate blocks of code that can be identified by embodiments of the invention include, for example, candidate surface texture blocks of code, candidate surface reflectance blocks of code, candidate surface color blocks of code, and/or candidate object transformation blocks of code. According to the invention, a simplified block of code includes, for example, a block of code that requires less time to execute than an associated candidate block of code, a block of code that requires less hardware to execute than an associated candidate block of code, a block of code that requires fewer textures to execute than an associated candidate block of code, and/or a block of code that requires fewer passes through a rendering pipeline to execute than an associated candidate block.

Under the control of the computer program logic, the host system associates each candidate block of code and each simplified block of code with at least one input parameter. According to the invention, an input parameter can be, for example, a parameter relating to rendering time, a parameter relating to distance between a computer modeled object and a computer modeled eye, a parameter relating to screen size of an object, and/or a parameter relating to angular position of an object relative to a computer modeled eye. Input parameters may be associated with a single block of code or with multiple blocks of code. A particular block of code can be associated with a single input parameter or multiple input parameters. Candidate blocks of code and simplified blocks of code are assembled into a level of detail shading function and stored in a computer readable medium.

In embodiments of the invention, at least one level of detail shading function stored in a computer readable medium is used to shade computer generated images in real-time. In these embodiments, the state of the at least one input parameter is specified, for example, by an application program variable, and used to determine how an object is to be shaded during rendering. In accordance with the invention, the specified input parameter is used to select at least one block of code from the level of detail shading function. This at least one block of code is then used in shading a rendered object.

It is an advantage of the present invention that embodiments can be implemented using one or more passes through the graphics pipelines of commercially available graphics accelerator cards.

Further features and advantages of the present invention, as well as the structure and operation of various embodiments of the present invention, are described in detail below with reference to the accompanying-drawings.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE INVENTION

As described herein, the present invention provides a system, method, and computer program product for real-time shading of computer generated images. The detailed description of the present invention that follows begins with a terminology subsection that defines terms used to describe the invention. This subsection is then followed by subsections that describe in detail various embodiments of the invention. Finally, this section concludes by describing a computer system that can be used to implement the invention.

Terminology

The following terms are defined so that they may be used to describe embodiments of the present invention. As used herein:

"Bump Map" means an image used to control local changes in the surface orientation when shading a surface. A bump map makes it possible to provide bumpiness effects on an otherwise flat surface.

"Candidate Block of Code" means a portion of the code of a shading function.

"Computer Readable Medium" means any medium useful for storing data. A computer readable medium can include semiconductor memory, magnetic media, optical media, or other recordable media.

"Image" or "scene" means an array of data values. A typical image might have red, green, blue, and/or alpha pixel data, or other types of pixel data information as known to a person skilled in the relevant art.

"Input Parameter" means a parameter used to select a block of code from a level of detail shading function. An input parameter can be, for example, a parameter relating to rendering time, a parameter relating to distance between a computer modeled object and a computer modeled eye, a parameter relating to screen size of an object, and/or a parameter relating to angular position of an object relative to a computer modeled eye. Input parameters may be associated with a single block of code or with multiple blocks of code. A particular block of code can be associated with a single input parameter or multiple input parameters.

"Level of Detail Shading Function" means a shading function according to the invention that includes at least one candidate block of code and at least one simplified block of code related to the candidate block of code.

"Motion Transformation" means a transformation that changes the appearance of an object so as to make it seem to a viewer as if the object is moving between successive display frames.

"Object Transformation Block of Code" means computer program logic used to implement a motion transformation.

"Pixel" means a data structure, which is used to represent a picture element. Any type of pixel format can be used.

"Reflection image" means an array of pixels, texels, or intensity values that encode reflection data according to the invention. The terms reflection image, texture image, and texture map may be used interchangeably.

"Shading" means the part of image rendering concerned with the appearance of each surface as seen in a computer generated image.

"Shading Function" or "Shading Procedure" means that part of a rendering program that calculates the appearance of visible surfaces in a computer generated image.

"Simplified Block of Code" means code that can be used in lieu of a candidate block of code to shade an object. A simplified block of code includes, for example, a block of code that requires less time to execute than an associated candidate block of code, a block of code that requires less hardware to execute than an associated candidate block of code, a block of code that requires fewer textures to execute than an associated candidate block of code, and/or a block of code that requires fewer passes through a rendering pipeline to execute than an associated candidate block.

"Surface Texture Block of Code" means computer program logic used to implement the texture properties of surfaces in a computer generated image.

"Surface Color Block of Code" means computer program logic used to implement the color properties of surfaces in a computer generated image.

"Surface Reflectance Block of Code" means computer program logic used to implement the reflectance properties of surfaces in a computer generated image.

"Texture image" means an array of texels. A texel can be a color or an intensity value. A texture image can be any array of values that is used to determine a value for a pixel. As used herein, the term "texture image" includes, for example, texture maps, bump maps and gloss maps.

"Texel" means a texture element.

"Texture sample" means a sample selected from a texture map or texture image. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample, a bilinearly filtered texture sample, or a trilinearly filtered texture sample) from a texture image.

"Real-time" refers to a rate at which successive display images can be redrawn without undue delay upon a user or application. This interactive rate can include, but is not limited to, a nominal rate of between 30–60 frames/second. In some example embodiments, such as some flight simulators or some interactive computer games, an interactive rate may be approximately 10 frames/second. In some examples, real-time can be one update per second.

Example Architecture of the Invention

Figure 1:
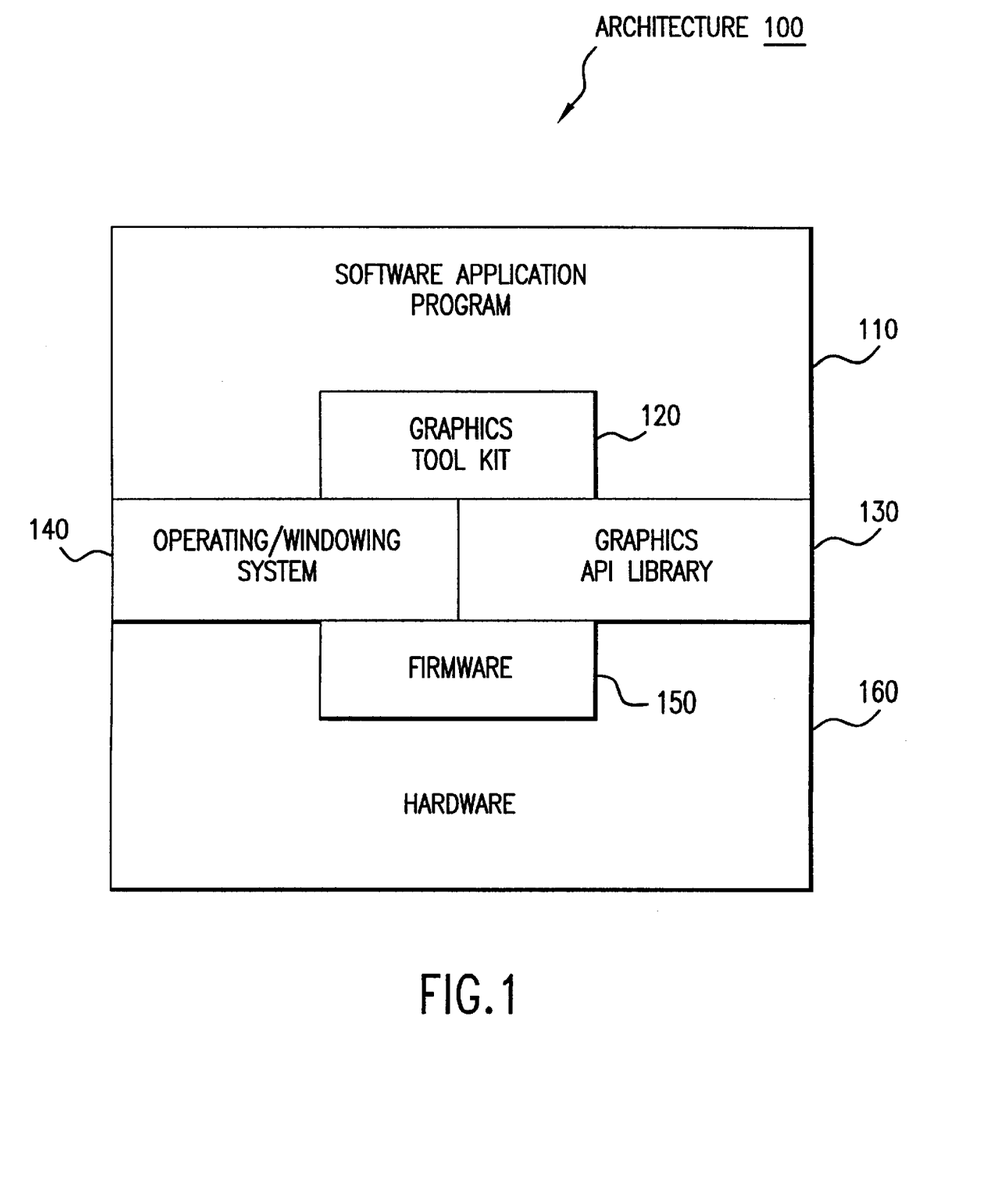
FIG. 1 illustrates an example architecture in which the invention can be implemented.

FIG. 1 illustrates a block diagram of an example computer architecture 100 in which the various features of the present invention can be implemented. It is an advantage of the invention that it may be implemented in many different ways, in many environments, and on many different computers or computer systems.

Architecture 100 includes six overlapping layers. Layer 110 represents a high level software application program. Layer 120 represents a three-dimensional (3D) graphics software tool kit, such as OPENGL PERFORMER, available from Silicon Graphics, Incorporated, Mountain View, Calif. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110–160 of architecture 100 will be available in most commercially available computers.

As will be apparent to a person skilled in the relevant art after reading the description of the invention herein, various features of the invention can be implemented in any one of the layers 110–160 of architecture 100, or in any combination of layers 110–160 of architecture 100.

Example System Embodiment of the Present Invention

Figure 2:
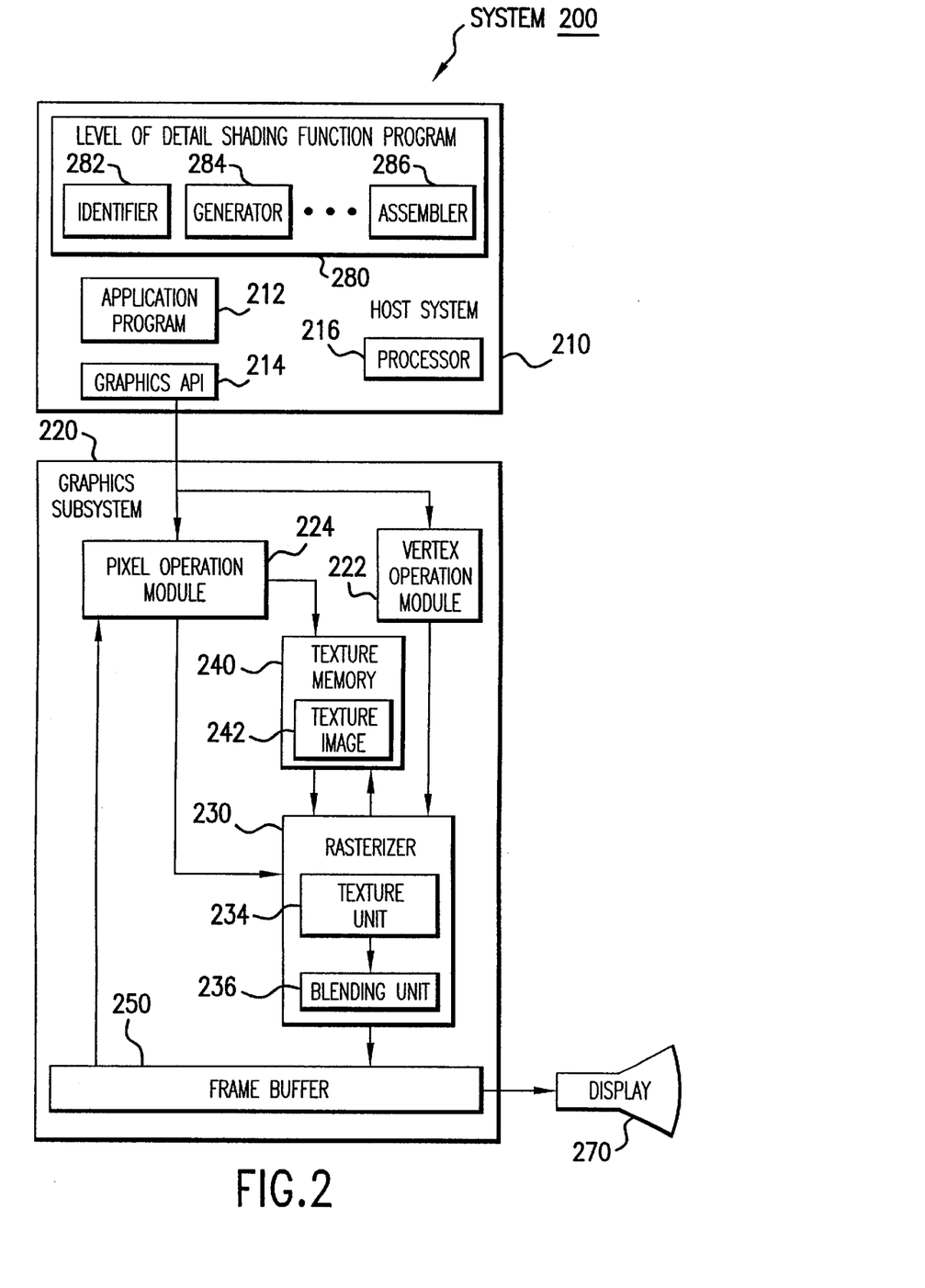
FIG. 2 illustrates an example system embodiment of the invention.

FIG. 2 illustrates an example graphics system 200 according to an embodiment of the present invention. Graphics system 200 comprises a host system 210, a graphics subsystem 220, and a display 270. Each of these features of graphics system 200 is further described below.

Host system 210 comprises an application program 212, a hardware interface or graphics API 214, a level of detail shading function program 280, and a processor 216. As shown in FIG. 2, level of detail shading function program 280 include modules that produce a shading procedure for real-time rendering of computer images from a shading function. A first module (not shown) of program 280 receives a shading function. Typically, the received shading function is developed by a graphics programer. A module 282 (Identifier) identifies in the shading function at least one candidate block of code for simplification. A module 284 (Generator) generates, for each candidate block of code identified by module 282, at least one simplified block of code that can be substituted for a candidate block of code during image rendering. A module 286 (Assembler) assembles candidate blocks of code and simplified blocks of code into a level of detail shading function. Level of detail shading function program 280 can also include other modules (not shown). For example, program 280 can include a module that associates candidate blocks of code and simplified blocks of code with at least one input parameter. After assembly, a level of detail shading function according to the invention is typically stored using a computer readable medium.

Application program 212 can be any program requiring the rendering of a computer image or scene. The computer code of application program 212 is executed by processor 216. Application program 212 assesses the features of graphics subsystem 220 and display 270 through hardware interface or graphics API 214.

Graphics subsystem 220 comprises a vertex operation module 222, a pixel operation module 224, a rasterizer 230, a texture memory 240, and a frame buffer 250. Texture memory 240 can store one or more texture images 242. Texture memory 240 is connected to a texture unit 234 by a bus (not shown). Rasterizer 230 comprises texture unit 234 and a blending unit 236. The operation of these features of graphics system 200 would be known to a person skilled in the relevant art given the description herein.

In embodiments of the present invention, texture unit 234 can obtain either a point sample, a bilinearly filtered texture sample, or a trilinearly filtered texture sample from texture image 242. Blending unit 236 blends texels and/or pixel values according to weighting values to produce a single texel or pixel. The output of texture unit 238 and/or blending module 236 is stored in frame buffer 250. Display 270 can be used to display images or scenes stored in frame buffer 250.

The embodiment of the invention shown in FIG. 2 has a multipass graphics pipeline. It is capable of operating on each pixel of an object (image) during each pass that the object makes through the graphics pipeline. For each pixel of the object, during each pass that the object makes through the graphics pipeline, texture unit 234 can obtain a single texture sample from the texture image 242 stored in texture memory 240.

Figure 3:
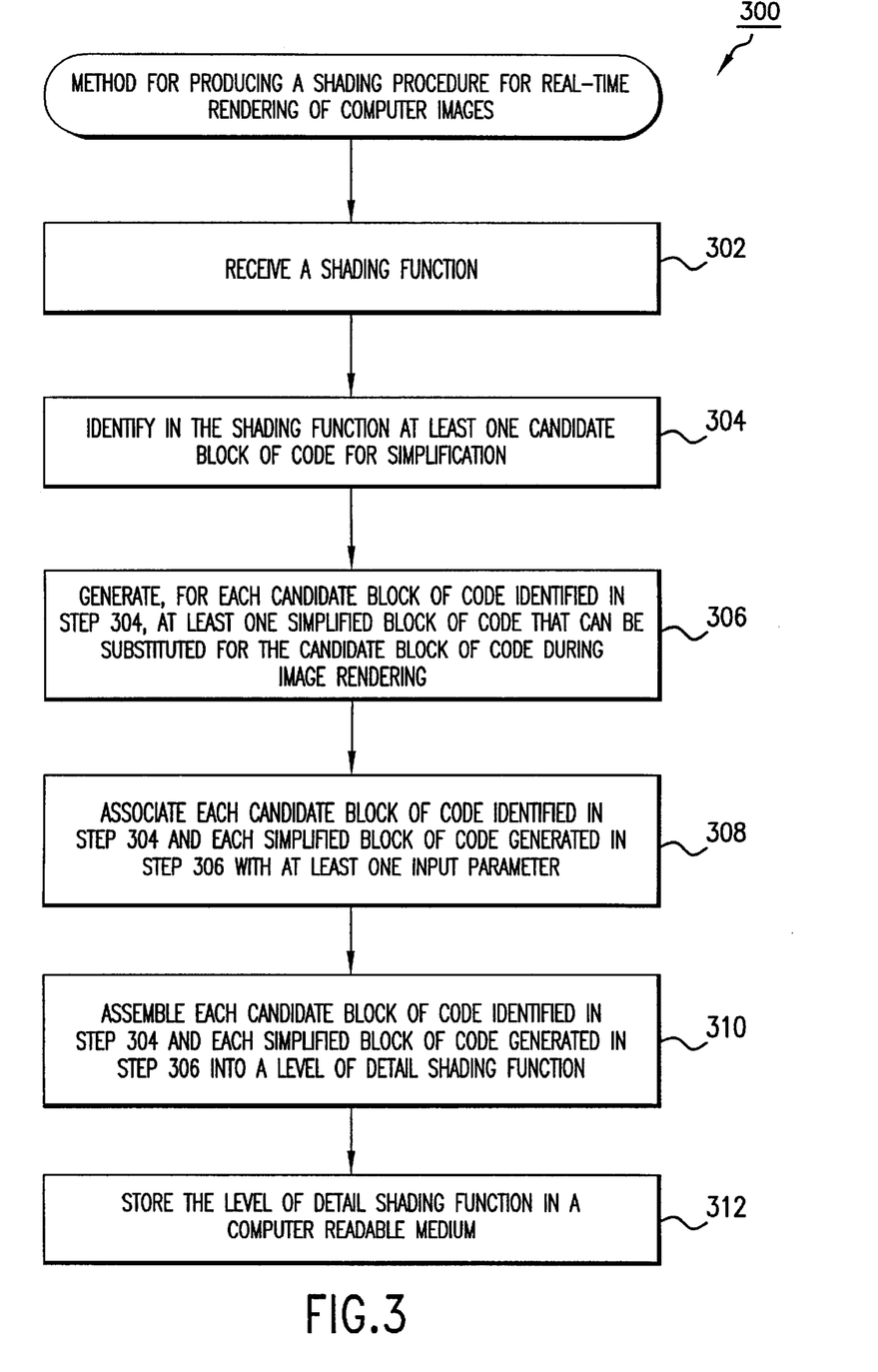
FIG. 3 is a flowchart of the steps of a method embodiment of the invention.

Example Method Embodiment of the Invention for Producing a Level of Detail Shading Function FIG. 3 illustrates a flowchart of the steps of a method 300 for producing a shading procedure (i.e., a level of detail shading function) for real-time rendering of computer images according to the present invention. The method can be implemented using system embodiments of the present invention (e.g., system 200). Method 300 is described with reference to the features illustrated in FIG. 2.

Method 300 begins with step 302. In step 302, a shading function is received using level of detail shading function program 280. In an embodiment, the shading function (e.g., shading function 502 of FIG. 5) is received by reading it from a memory. As would be known to a person skilled in the relevant computer graphics art, a shading function is that part of a rendering program that calculates the appearance of visible surfaces in a computer generated image. This point is illustrated in FIG. 4.

Figure 4:
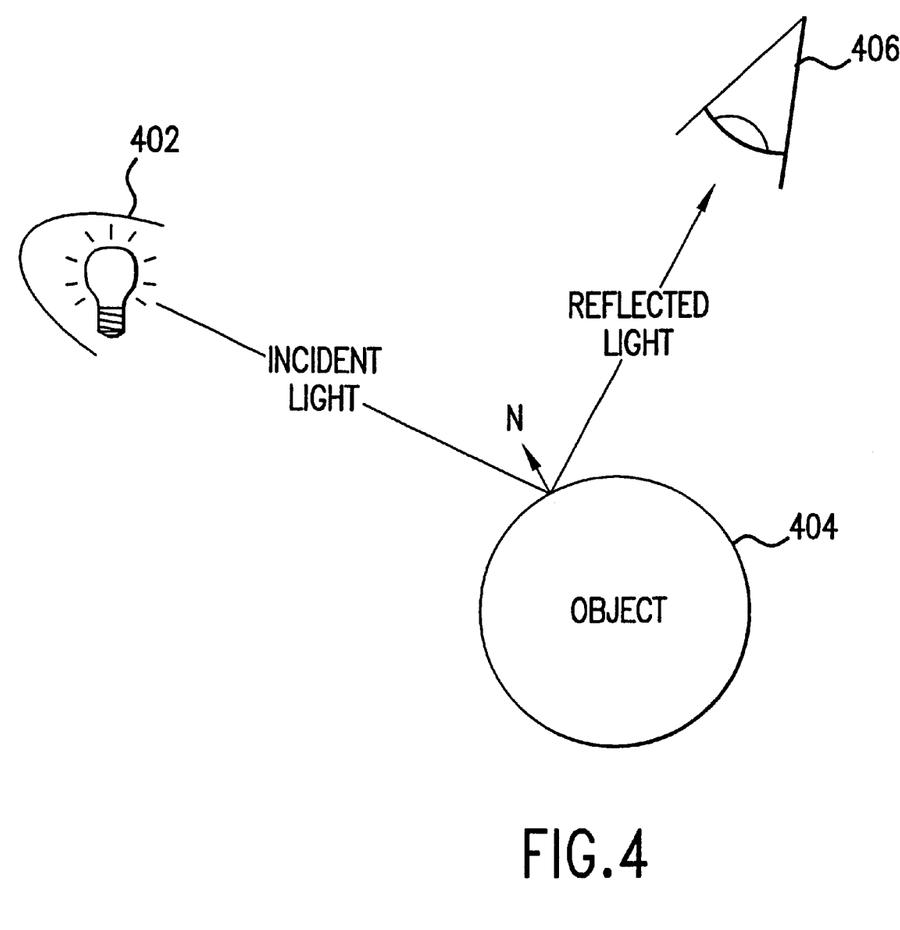
FIG. 4 illustrates an example application of a shading procedure.

In FIG. 4, light exiting an illumination source 402 is shown striking an object 404. Light striking object 404 is reflected towards a computer modeled eye 406. Computer modeled eye 406 (also referred to in the computer art as an eye point or virtual camera) represents the location of a viewer relative to the scene of FIG. 4. A shading function contains computer code or program logic that is used to simulate how object 404 appears to a viewer located at the computer modeled eye 406. For example, a shading function can be used to make object 404 appear as a wood object, a metal object, a plastic object, or a glass object. A shading function may also be used, for example, to describe the color and reflective properties of object 404 and the texture of object 404.

Figure 5:
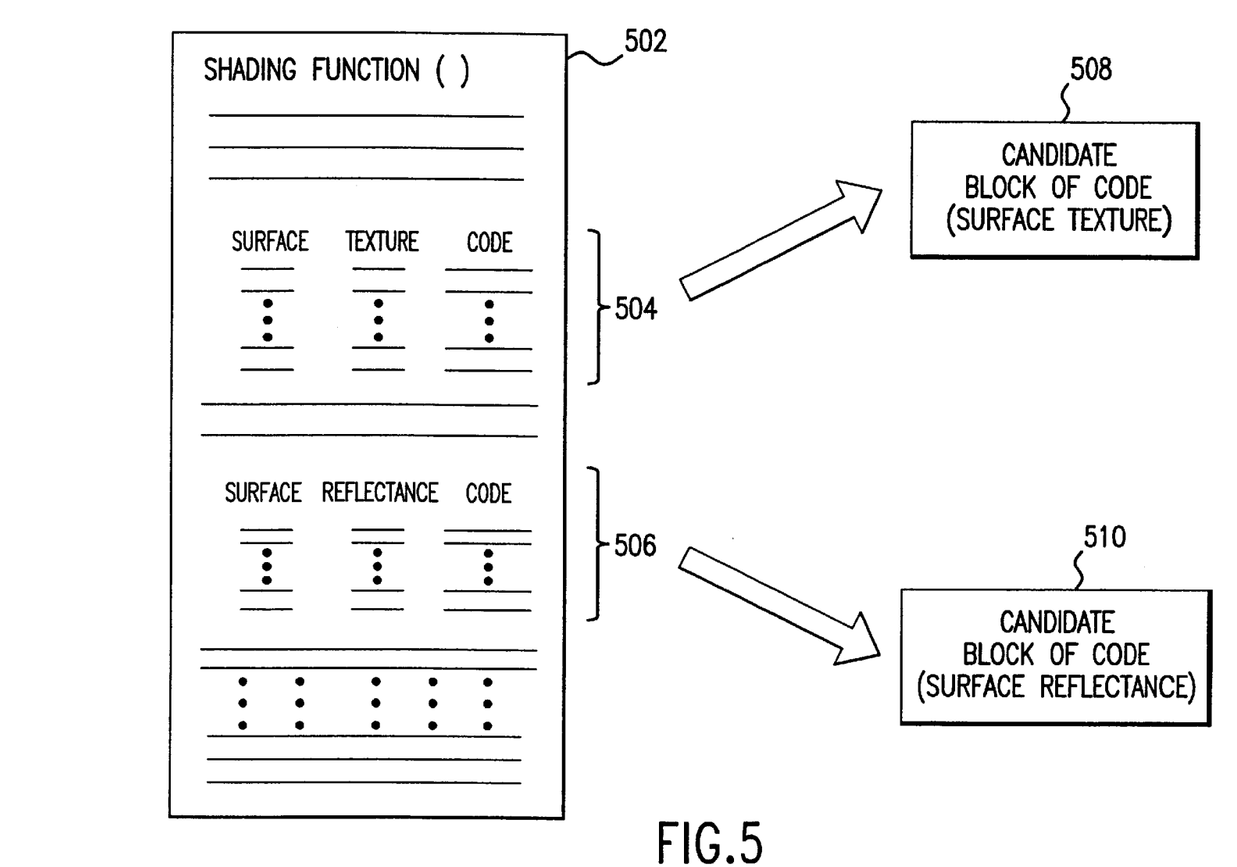
FIG. 5 illustrates a how candidate blocks of code are identified in a shading function according to an embodiment of the invention.

Referring to FIG. 3 again, in step 304, at least one candidate block of code for simplification is identified in the received shading function. As shown in FIG. 5, a shading function may contain more than one block of code that can be identified in step 304 as a candidate block of code for simplification. For example, shading function 502 in FIG. 5 is shown as containing two blocks of code 504 and 506 that have been identified as candidate blocks of code. Block of code 504 relates to surface texture properties. Block of code 504 has been identified as a candidate block of code 508. Block of code 506 relates to surface reflectance properties. Block of code 506 has been identified as a candidate block of code 510. A received shading function may contain more than two blocks of code that can be identified as candidate blocks of code according to the invention. Furthermore, there is no requirement of method 300 that all of the code relating to a particular candidate block of code, such as block of code 506, be located in just one section of shading function 502 or identified, for example, by a subroutine call as having a particular function.

In an embodiment, identifier 282 is used to analyze shading function 502 and identify blocks of code 504 and 506 as candidate blocks of code 508 and 510, respectively. For example, in an embodiment identifier 282 analyzes the code of a shading function to identify input and output variables associated, for example, with a surface reflectance block of code, a surface texture block of code, a surface color block of code, and/or an object transformation block of code. As will be understood by a person skilled in the relevant computer art, following variable references in a shading function simplifies the identification of a chain of computation that can be used to identify and isolate candidate blocks of code for simplification.

In step 306, in FIG. 3, at least one simplified block of code is generated for each candidate block of code identified in step 304. In an embodiment, generator 284 is used to generate the at least one simplified block of code. This step is illustrated in FIG. 6.

Figure 6:
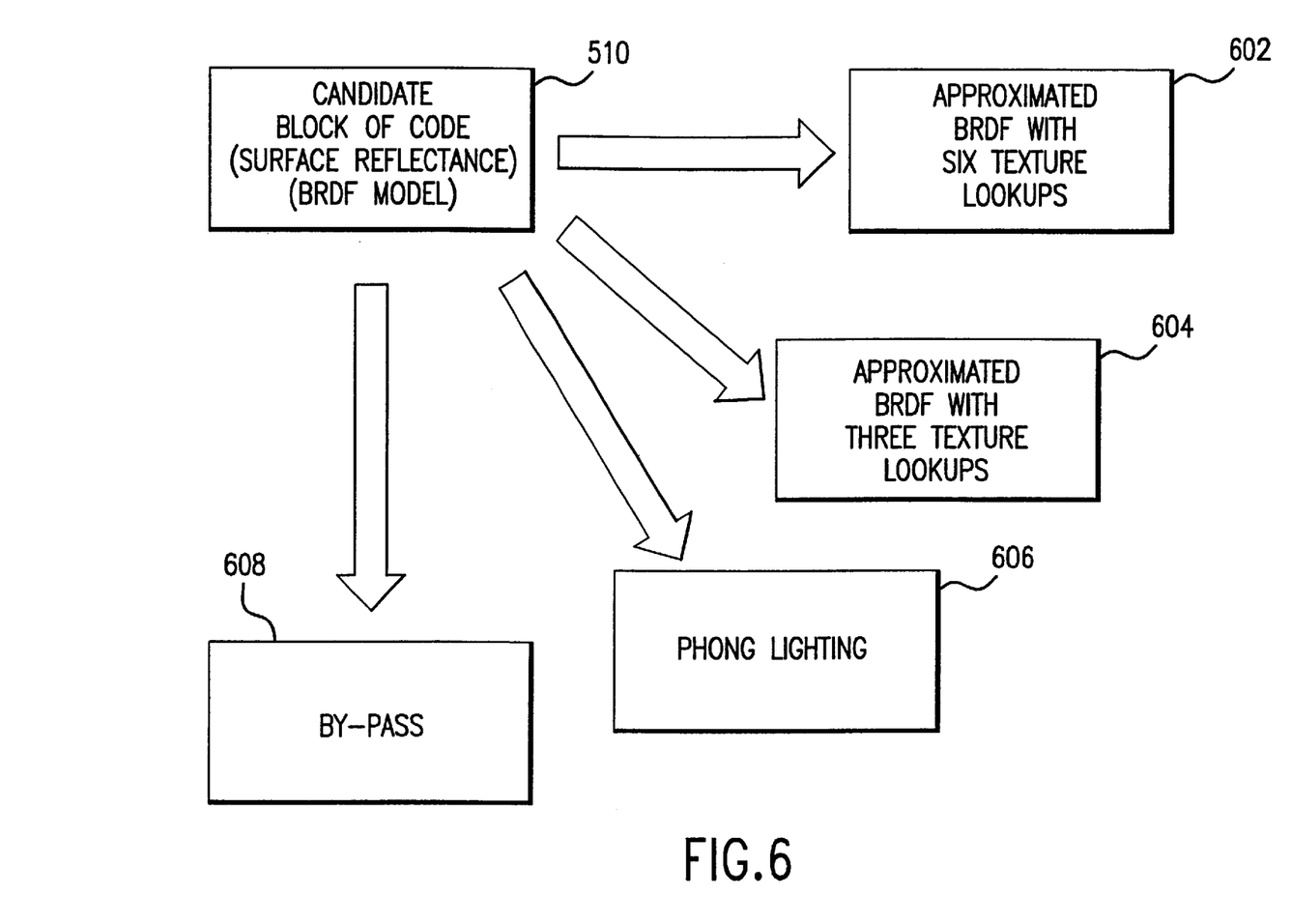
FIG. 6 illustrates how simplified blocks of code are generated according to an embodiment of the invention.

Referring now to FIG. 6, simplified blocks of code 602, 604, 606, and 608 are generated from candidate block of code 510, as shown in FIG. 6, using generator 284. Candidate block of code 510 represents a bi-directional reflectance distribution function (BRDF) model. The code of candidate block of code 510 is operated upon by generator 284 to generate simplified block of code 602, which implements an approximate BRDF with six texture lookups. The code of candidate block of code 510 can also be used with generator 284 to generate simplified block of code 604, which implements an approximate BRDF with only three texture lookups. See Michael D. McCool et al., "Homomorphic Factorization of BDRFs for High-Performance Rendering," in Proceedings of SIGGRAPH 2001, ACM Press/ACM SIGGRAPH, Computer Graphics Proceedings, Annual Conference Series, pages 171–178 (August 2001), which is incorporated herein in its entirety by reference, for a description of one way to approximate arbitrary BRDFs with several textures. The code of candidate block of code 510 can also be used with generator 284 to generate simplified block of code 606, which implements Phong lighting. In an extreme form of simplification, simplified block of code 608 represents a complete by-pass of any surface reflectance code or computer program logic (e.g., no computer program logic).

Figure 7:
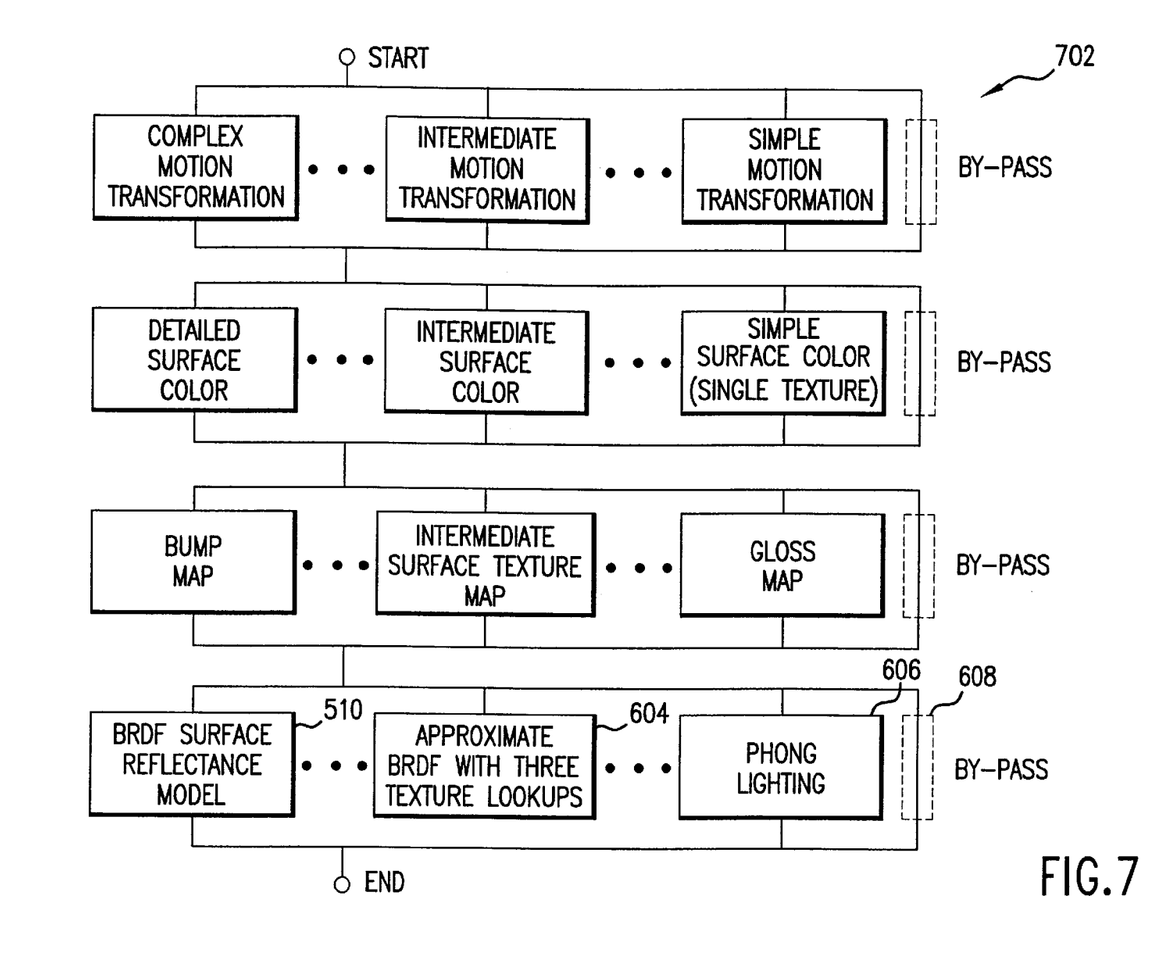
FIG. 7 illustrates how candidate blocks of code and simplified blocks of code are assembled according to an embodiment of the invention.

Step 306 is further illustrated in FIG. 7. As illustrated in FIG. 7, generator 284 can be used to generate a wide variety of simplified blocks of code from candidate blocks of code. For example, an intermediate surface texture map or a gloss map can be generated by generator 284 from a bump map. Similarly, a block of code for implementing a simple motion transformation or an intermediate motion transformation can be generated using generator 284 from a candidate block of code that implements a complex motion transformation. As will become apparent to a person skilled in the relevant art given the description herein, simplified blocks of code according to the invention include, for example, blocks of code that require less time to execute than an associated candidate block of code, blocks of code that require less hardware to execute than an associated candidate block of code, blocks of code that require fewer textures to execute than an associated candidate block of code, and/or blocks of code that require fewer passes through a rendering pipeline to execute than an associated candidate block. In an embodiment, step 306 involves retrieving at least one simplified block of code from a library of shading procedures stored in a computer readable medium.

Referring to FIG. 3 again, in step 308, each candidate block of code identified in step 304 and each simplified block of code generated in step 306 are associated with at least one input parameter. As described further below, the purpose of associating candidate blocks of code and simplified blocks of code with input parameters is to allow these blocks of code to be selectively implemented during the rending of an object. Input parameters can be associated with particular blocks of code in any manner desired. For example, a single input parameter may be associated with one, two, or more blocks of code. In a like manner, one, two, or more input parameters can be associated with a single block of code. This is useful for example for allowing one input parameter, (e.g., available rending time) to override or take precedence over a second input parameter (e.g., screen size of an object or the number of screen pixels that an object covers). In embodiments of the invention, an input parameter can be, for example, a parameter relating to rendering time, a parameter relating to distance between a computer modeled object and a computer modeled eye, a parameter relating to screen size of an object, and/or a parameter relating to angular position of an object relative to a computer modeled eye. Other useful input parameters for selecting among blocks of code will become apparent to persons killed in the relevant computer art given the description of the, invention herein.

In step 310, candidate blocks of code identified in step 304 and simplified block of code generated in step 306 are assembled into a level of detail shading function according to the invention. FIG. 7 illustrates an example assembly for a level of detail shading function 702 that has been assembled in accordance with step 310. As shown in FIG. 7, the assembly of level of detail shading function 702 permits the selection of candidate block of code 510 or simplified blocks of code 604, 606, and 608 during rendering. As would be known to a person skilled in the relevant computer art, the blocks of code that make up level of detail shading function 702 can be assembled as shown in FIG. 7 using "if . . . else if" statements or similar programming structures. The assembly of level of detail shading function 702 is only illustrative, and it is not intended to limit the present invention. Other assemblies in accordance with the invention are also possible. In an embodiment, assembler 286 is used to form level of detail shading function 702.

In step 312, in FIG. 3, the level of detail shading function formed, for example, by assembler 286 in step 310 is stored in a computer readable medium. This allows level of detail shading functions according to the invention to be assessed by application programs and used to shade an object during rendering.

Figure 8:
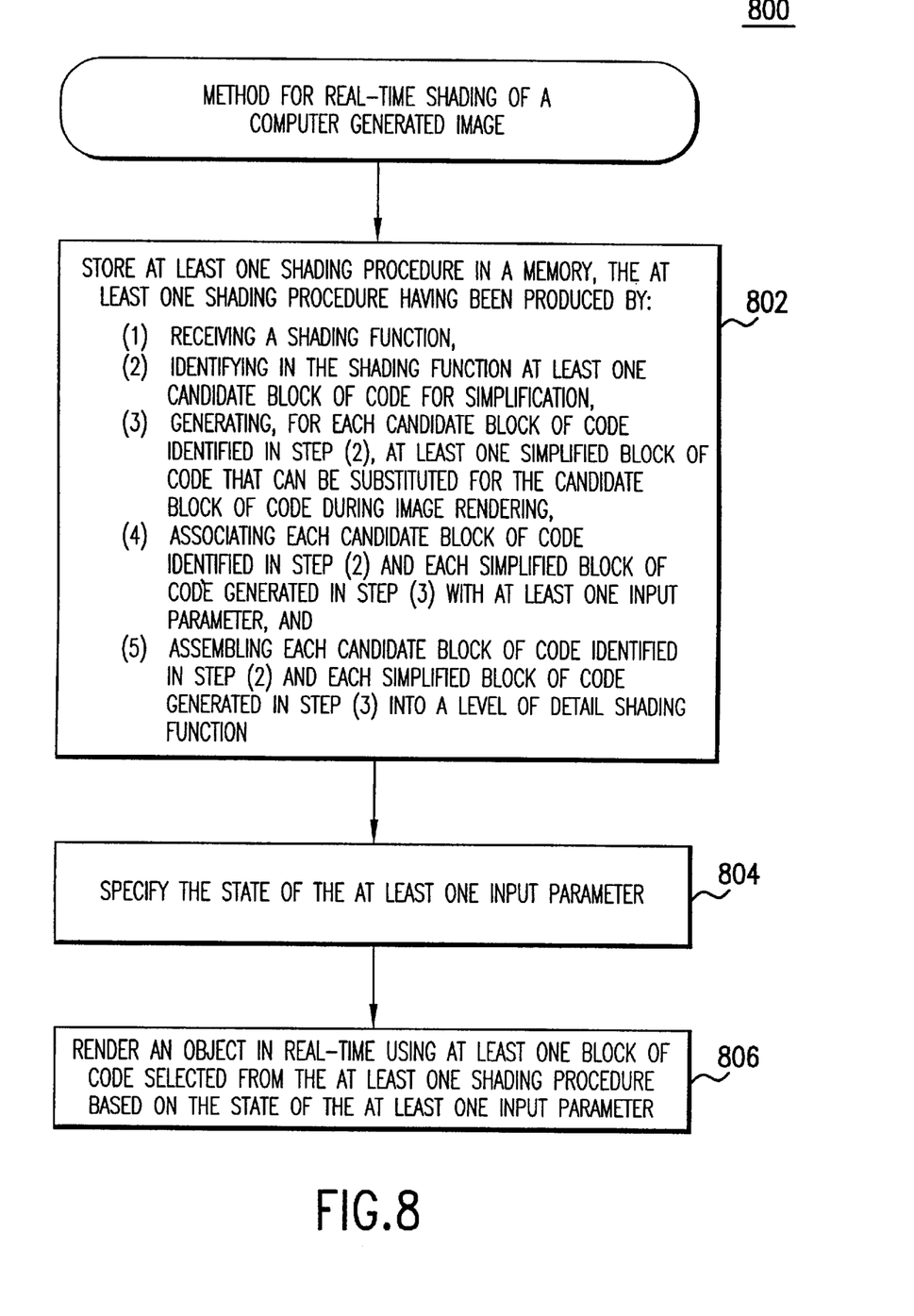
FIG. 8 is a flowchart of the steps of a second method embodiment of the invention.

As described herein, a level of detail shading function produced according method 300 can be used by an application program (e.g., application program 212) in accordance with a second method of the invention (e.g., method 800) to flexibly shade objects and create computer scenes in real-time.

In an embodiment, method 300 is used as described herein to produce a shading procedure (i.e., level of detail shading function) from a complex shader and associated textures. The result of method 300 is a single shader (i.e., level of detail shading function) that can be applied by an application program to any object during rendering. The shader automatically adjusts its rendering cost and appearance based on input parameters such as distance or available time provided by the application program. This advantage of the invention is further illustrated by the following example.

To better understand the invention, consider, for example, trying to render a relatively detailed leather surface for a car seat. The surface of the car seat can have a coarse vein structure. There can be dust in crevices of the car seat, and the car seat can have some fine bumps on its smooth surfaces. Typical values for leather could be used for the color and surface reflectance of the car seat. Consider also having some measured BRDF data to be used to reproduce the features of the car seat (though there are scuffs of different color and reflectance). This amount of detail can be produced using complex shading.

As would be known to a person skilled in the relevant computer art, a shader for this leather might use a bump map for the veins and another bump map for the little bumps. This changes the lighting as if there were bumps without actually changing the surface geometry. The dust in the crevices of the car seat can be reproduced using an overlay texture map. The scuffs can be reproduced using another texture map that is used to pick between two BRDFs, each based on a McCool 3-texture BRDF model.

If the car seat is shaded as described in the above example, the car seat will appear realistic to a viewer when the viewer is near the car seat. However, when the viewer is looking at the outside of the car (i.e., is "far" from the seat), and just sees a portion of the car seat through the window, it is a costly way to shade the car seat because unnecessary detail has been generated. The need for a less costly car seat shader is even more evident when the car is just one of hundreds in a city scene, with roads, buildings and pedestrians, all with similar shading detail. Thus, one would typically want to manually create a multitude of shading functions or have a shader that drops less important details as the distance from the car seat to the viewer increases. For example, as the distance from the car seat to the viewer increases, one might first want to eliminate the little bumps. Next, as the distance increase, one might turn the vein bumps into a specularity mask, which is simpler but less accurate. As the distance between the car seat and the viewer continues to increase, one would likely want to eliminate the dust in the veins, followed by the scuffs. Next, one would probably want to get rid of the veins entirely, leaving just a single 3-texture BRDF. Finally, one would likely want to replace even this shading model with the Phong shading model built into available graphics hardware. This manual method of shading requires one to write a multitude of different shading functions, and these functions must be combined, for example, with all the choices written out (e.g., if (distance_ in_feet<1) do_shading_option_A). Method 300, however, allows this manual method to be automated.

As will be understood by a person skilled in the relevant art given the description herein, in an embodiment of the invention, graphics tools and/or a graphics toolkit are used to automate the building of level of detail shaders (e.g., simple shaders) from a complex shader and associated textures. The tools and/or toolkit are used to do frequency analysis on the textures and operations of a complex shader, and automatically produce several different, simpler blocks of code based, for example, on the following operations: (1) removal—drop something when it is deemed to have little impact (like the dust in the above example); (2) collapse—combine multiple operations into fewer operations (e.g., the tools can combine the vein and tiny bump bump-maps into one bump-map); and (3) substitution—replace a complex operation with a simpler one (e.g,. BRDF with Phong, and bump map with specular map) (substitution can also be used to replace a set of operations with a texture that results either from running those operations in advance or run-time of an application program). How to design these tools and/or toolkits according top the invention will become apparent to persons skilled in the relevant art given the description herein.

Example Method Embodiment of the Invention for Real-Time Shading of a Computer Generated Image Using a Level of Detail Shading Function FIG. 8 illustrates a flowchart of the steps of a method 800 for real-time shading of a computer generated image according to the present invention. As with method 300, method 800 can be implemented using system embodiments of the present invention (e.g., system 200). Method 800 is described with reference to the features illustrated in FIG. 2.

Referring to FIG. 8, method 800 begins with step 802. In step 802, at least one level of detail shading function according to the invention is stored in a memory. As described herein, level of detail shading functions according to the invention can be produced using method 300. In embodiments of the invention, the at least one level of detail shading function may form a part of graphics API 214.

In step 804, the state of at least one input parameter is specified. This parameter is used to select a block of code from a level of detail shading function. As described above with regard to method 300, each block of code of a level of detail shading function is associated with one or more input parameters. As would be apparent to a person skilled in the relevant art given the description herein, the at least one input parameter may be specified using a user input. It may also be specified by a dynamic program variable related to a state of an application program (e.g., application program 212). The program variable need not be under the control of a program user.

In step 806, a block of code associated with the at least one parameter specified in step 804 is used to shade/render an object in real-time. How to implement method 800 will be known to a person skilled in the relevant computer art given the description of the invention herein.

As described herein, an advantage of the present invention is that level of detail shading functions according to the invention can be generated in advance of running application program 212, and assessed during the execution of application program 212 to permit application program 212 to execute in real-time. As described herein, the invention is very flexible, and further features and advantages of the present invention will be apparent to a person skilled in the relevant art given the description of the invention herein.

Figure 9:
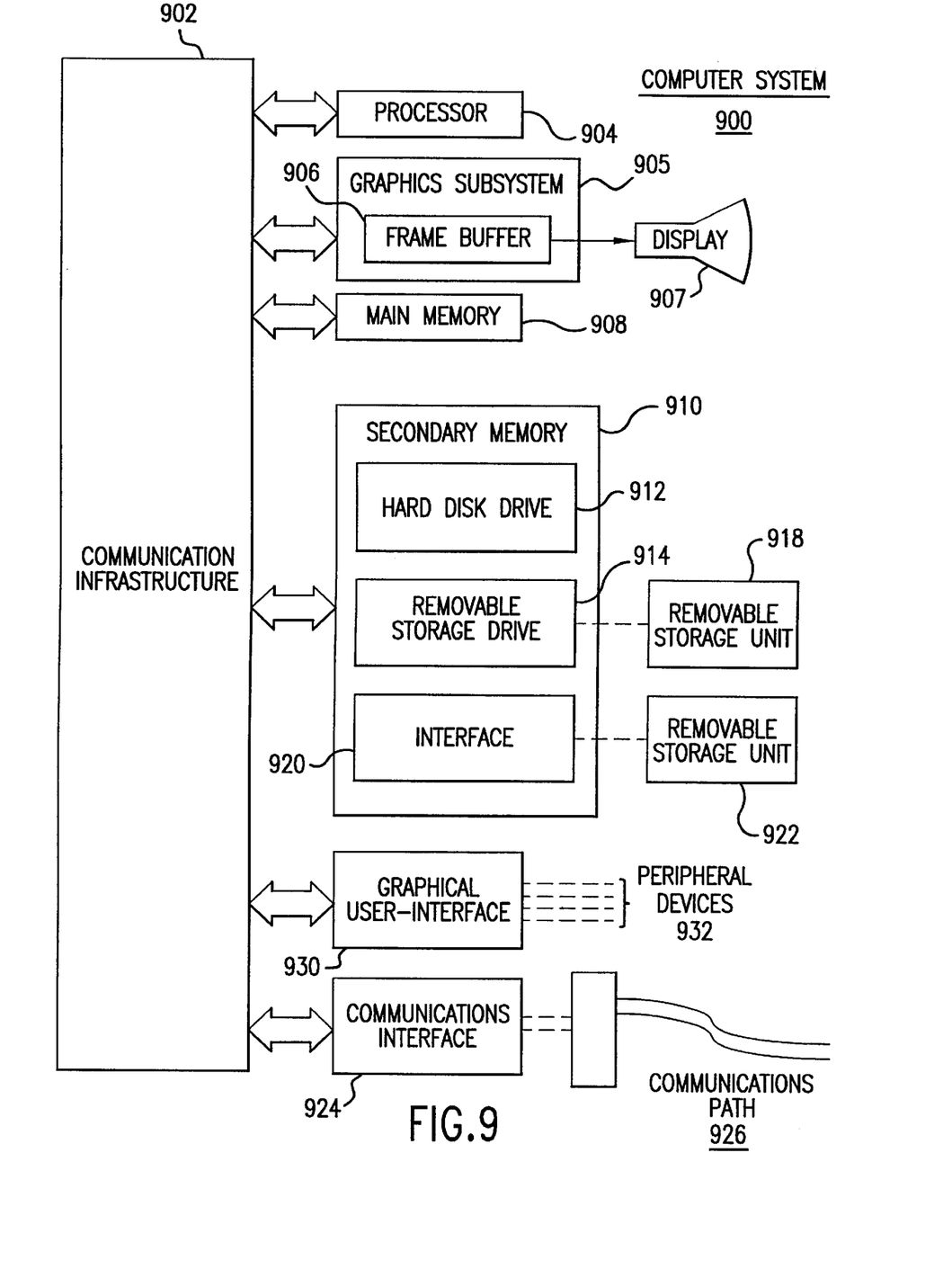
FIG. 9 illustrates an example computer system that can be used to implement the invention.

Example Computer System for Implementing Computer Program Product Embodiments of the Invention FIG. 9 illustrates an example of a computer system 900 that can be used to implement computer program product embodiments of the present invention. This example computer system is illustrative and not intended to limit the present invention. Computer system 900 represents any single or multi-processor computer. Single-threaded and multi-threaded computers can be used. Unified or distributed memory systems can be used.

Computer system 900 includes one or more processors, such as processor 904, and one or more graphics subsystems, such as graphics subsystem 905. One or more processors 904 and one or more graphics subsystems 905 can execute software and implement all or part of the features of the present invention described herein. Graphics subsystem 905 can be implemented, for example, on a single chip as a part of processor 904, or it can be implemented on one or more separate chips located on a graphic board. Each processor 904 is connected to a communication infrastructure 902 (e.g., a communications bus, cross-bar, or network). After reading this description, it will become apparent to a person skilled in the relevant art how to implement the invention using other computer systems and/or computer architectures.

Computer system 900 also includes a main memory 908, preferably random access memory (RAM), and can also include secondary memory 910. Secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

In an embodiment, computer system 900 includes a frame buffer 906 and a display 907. Frame buffer 906 is in electrical communication with graphics subsystem 905. Images stored in frame buffer 906 can be viewed using display 907.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Computer system 900 can include one or more peripheral devices 932, which are coupled to communications infrastructure 902 by graphical user-interface 930. Example peripheral devices 932, which can from a part of computer system 900, include, for example, a keyboard, a pointing device (e.g., a mouse), a joy stick, and a game pad. Other peripheral devices 932, which can form a part of computer system 900 will be known to a person skilled in the relevant art given the description herein.

The present invention can be implemented using software running (that is, executing) in an environment similar to that described above with respect to FIG. 9. In this document, the term "computer program product" is used to generally refer to removable storage unit 918, a hard disk installed in hard disk drive 912, or a carrier wave or other signal carrying software over a communication path 926 (wireless link or cable) to communication interface 924. A computer useable medium can include magnetic media, optical media, or other recordable media, or media that transmits a carrier wave. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. Alternatively, the computer program product may be downloaded to computer system 900 over communications path 926. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

Various embodiments of the present invention have been described above, which are independent of image complexity and are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for producing a shading procedure for real-time rendering of computer images, comprising the steps of:
   (1) receiving a shading function;
   (2) identifying in the shading function at least one candidate block of code for simplification;
   (3) generating, for each candidate block of code identified in step (2), at least one simplified block of code that can be substituted for the candidate block of code during image rendering;
   (4) associating each candidate block of code identified in step (2) and each simplified block of code generated in step (3) with at least one input parameter;
   (5) assembling each candidate block of code identified in step (2) and each simplified block of code generated in step (3) into a level of detail shading function, wherein the at least one input parameter is used to select at least one block of code that is to be used to shade an object during rendering of the object; and
   (6) storing the level of detail shading function in a computer readable medium.

2. The method of claim 1, wherein step (1) comprises retrieving the shading function from a memory.

3. The method of claim 1, wherein step (2) comprises identifying a candidate surface texture block of code.

4. The method of claim 1, wherein step (2) comprises identifying a candidate surface reflectance block of code.

5. The method of claim 1, wherein step (2) comprises identifying a candidate surface color block of code.

6. The method of claim 1, wherein step (2) comprises identifying a candidate object transformation block of code.

7. The method of claim 1, wherein step (3) comprises retrieving at least one simplified block of code from a library of shading procedures stored in a computer readable medium.

8. The method of claim 1, wherein step (3) comprises generating a simplified block of code that requires less time to execute than an associated candidate block of code identified in step (2).

9. The method of claim 1, wherein step (3) comprises generating a simplified block of code that requires less hardware to execute than an associated candidate block of code identified in step (2).

10. The method of claim 1, wherein step (3) comprises generating a simplified block of code that requires fewer textures to execute than an associated candidate block of code identified in step (2).

11. The method of claim 1, wherein step (3) comprises generating a simplified block of code that requires fewer passes through a rendering pipeline to execute than an associated candidate block of code identified in step (2).

12. The method of claim 1, wherein step (4) further comprises the step of associating at least one candidate block of code and at least one simplified block of code with an input parameter relating to rendering time.

13. The method of claim 1, wherein step (4) further comprises the step of associating at least one candidate block of code and at least one simplified block of code with an input parameter relating to distance between a computer modeled object and a computer modeled eye.

14. The method of claim 1, wherein step (4) further comprises the step of associating at least one candidate block of code and at least one simplified block of code with an input parameter relating to screen size of an object.

15. The method of claim 1, wherein step (4) further comprises the step of associating at least one candidate block of code and at least one simplified block of code with an input parameter relating to angular position of an object relative to a computer modeled eye.

16. The method of claim 1, wherein step (4) further comprises the step of associating at least one candidate block of code and at least one simplified block of code with at least two input parameters.

17. A method for real-time shading of a computer generated image, comprising the steps of:
   storing at least one shading procedure in a memory, the at least one shading procedure having been produced by:
      (1) receiving a shading function,
      (2) identifying in the shading function at least one candidate block of code for simplification,
      (3) generating, for each candidate block of code identified in step (2), at least one simplified block of code that can be substituted for the candidate block of code during image rendering,
      (4) associating each candidate block of code identified in step (2) and each simplified block of code generated in step (3) with at least one input parameter, and
      (5) assembling each candidate block of code identified in step (2) and each simplified block of code generated in step (3) into a level of detail shading function;
   specifying the state of the at least one input parameter; and
   rendering an object in real-time using at least one block of code selected from the at least one shading procedure based on the state of the at least one input parameter.

18. The method of claim 17, further comprising the step of using a simplified surface texture block of code to render the object.

19. The method of claim 17, further comprising the step of using a simplified surface reflectance block of code to render the object.

20. The method of claim 17, further comprising the step of using a simplified surface color block of code to render the object.

21. The method of claim 17, further comprising the step of using a simplified object transformation block of code to render the object.

22. A system for real-time shading of a computer generated image, comprising:
- means for storing at least one shading procedure in a memory, the at least one shading procedure having been produced by:
  (1) receiving a shading function,
  (2) identifying in the shading function at least one candidate block of code for simplification,
  (3) generating, for each candidate block of code identified in step (2), at least one simplified block of code that can be substituted for the candidate block of code during image rendering,
  (4) associating each candidate block of code identified in step (2) and each simplified block of code generated in step (3) with at least one input parameter, and
  (5) assembling each candidate block of code identified in step (2) and each simplified block of code generated in step (3) into a level of detail shading function, wherein the at least one input parameter is used to select at least one block of code that is to be used to shade an object during rendering of the object;
- means for specifying the state of the at least one input parameter; and
- means for rendering an object in real-time using at least one block of code selected from the at least one shading procedure based on the state of the at least one input parameter.

23. A computer program product for producing a shading procedure for real-time rendering of computer images, said computer program product comprising a computer useable medium having computer program logic recorded thereon for controlling a processor, said computer program logic comprising:
- a procedure for receiving a shading function;
- a procedure for identifying in the shading function at least one candidate block of code for simplification;
- a procedure for generating, for each identified candidate block of code, at least one simplified block of code that can be substituted for the candidate block of code during image rendering;
- a procedure for associating each identified candidate block of code and each generated simplified block of code with at least one input parameter; and
- a procedure for assembling each identified candidate block of code and each generated simplified block of code into a level of detail shading function, wherein the at least one input parameter is used to select at least one block of code that is to be used to shade an object during rendering of the object.

24. The computer program product of claim 23, further comprising a procedure for identifying a candidate surface texture block of code.

25. The computer program product of claim 23, further comprising a procedure for identifying a candidate surface reflectance block of code.

26. The computer program product of claim 23, further comprising a procedure for identifying a candidate surface color block of code.

27. The computer program product of claim 23, further comprising a procedure for identifying a candidate object transformation block of code.

28. The computer program product of claim 23, further comprising a procedure for generating at least one simplified block of code that requires less time to execute than an associated candidate block of code.

29. The computer program product of claim 23, further comprising a procedure for generating at least one simplified block of code that requires less hardware to execute than an associated candidate block of code.

30. The computer program product of claim 23, further comprising a procedure for generating at least one simplified block of code that requires fewer textures to execute than an associated candidate block of code.

31. The computer program product of claim 23, further comprising a procedure for generating at least one simplified block of code that requires fewer passes through a graphics pipeline to execute than an associated candidate block of code.

32. The computer program product of claim 23, further comprising a procedure for associating at least one candidate block of code and at least one simplified block of code with an input parameter relating to rendering time.

33. The computer program product of claim 23, further comprising a procedure for associating at least one candidate block of code and at least one simplified block of code with an input parameter relating to distance between a computer modeled object and a computer modeled eye.

34. The computer program product of claim 23, further comprising a procedure for associating at least one candidate block of code and at least one simplified block of code with an input parameter relating to screen size of an object.

35. The computer program product of claim 23, further comprising a procedure for associating at least one candidate block of code and at least one simplified block of code with an input parameter relating to angular position of an object relative to a computer modeled eye.

36. The computer program product of claim 23, further comprising a procedure for associating at least one candidate block of code and at least one simplified block of code with at least two input parameters.

37. A computer program product for real-time shading of a computer generated image, said computer program product comprising a computer useable medium having computer program logic recorded thereon for controlling a processor, said computer program logic comprising:
- a procedure for storing at least one shading procedure in a memory, the at least one shading procedure having been produced by:
  (1) receiving a shading function,
  (2) identifying in the shading function at least one candidate block of code for simplification,
  (3) generating, for each candidate block of code identified in step (2), at least one simplified block of code that can be substituted for the candidate block of code during image rendering,
  (4) associating each candidate block of code identified in step (2) and each simplified block of code generated in step (3) with at least one input parameter, and
  (5) assembling each candidate block of code identified in step (2) and each simplified block of code generated in step (3) into a level of detail shading function;
- a procedure for specifying the state of the at least one input parameter; and a procedure for rendering an object in real-time using at least one block of code selected from the at least one shading procedure based on the state of the at least one input parameter.

38. A system for producing a shading procedure for real-time rendering of computer images, comprising:

a module that receives a shading function;

a module that identifies in the shading function at least one candidate block of code for simplification;

a module that generates, for each candidate block of code identified, at least one simplified block of code that can be substituted for the candidate block of code during image rendering;

a module that associates related candidate blocks of code and simplified blocks of code with at least one input parameter;

a module that assembles related candidate blocks of code and simplified blocks of code into a level of detail shading function, wherein the at least one input parameter is used to select at least one block of code that is to be used to shade an object during rendering of the object; and a module that stores the level of detail shading function in a computer readable medium.

* * * * *